Figure 1:
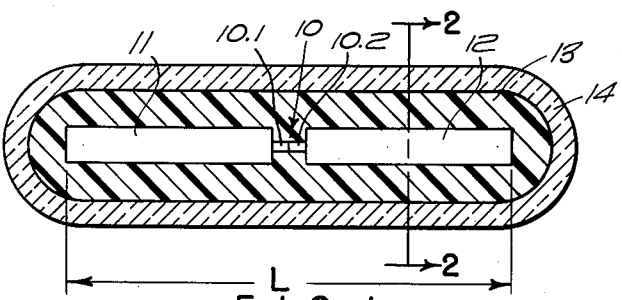

May 8, 1962

A. UHLIR, JR 3,034,079

HERMETICALLY SEALED SEMICONDUCTOR

Filed May 11, 1959

3 Sheets-Sheet 1

INVENTOR.
ARTHUR UHLIR, JR.
BY
*Alfred H. Rosen*
ATTORNEY

May 8, 1962 A. UHLIR, JR 3,034,079
HERMETICALLY SEALED SEMICONDUCTOR
Filed May 11, 1959 3 Sheets-Sheet 2

*INVENTOR.*
ARTHUR UHLIR, JR.
BY
*Alfred H. Rosen*
ATTORNEY

May 8, 1962 A. UHLIR, JR 3,034,079
HERMETICALLY SEALED SEMICONDUCTOR
Filed May 11, 1959 3 Sheets-Sheet 3

INVENTOR.
ARTHUR UHLIR, JR.
BY
ATTORNEY

United States Patent Office 3,034,079
Patented May 8, 1962

3,034,079
HERMETICALLY SEALED SEMICONDUCTORS
Arthur Uhlir, Jr., Reading, Mass., assignor to Microwave Associates, Inc., Burlington, Mass., a corporation of Massachusetts
Filed May 11, 1959, Ser. No. 812,545
21 Claims. (Cl. 333—98)

This invention relates in general to semiconductor devices, and more particularly to such devices in which a semiconductor element is provided with electromagnetic wave coupling elements or antennae and may be fully enclosed in an envelope which hermetically seals them from the atmosphere.

Semiconductor diodes, particularly those intended for use with microwave energy, frequently suffer serious losses, which cannot be predicted, from metal-to-metal pressure contacts through which they are customarily connected into waveguide and other microwave circuits. The ordinary diode holders which are in current use for example are a source of losses of energy, limiting the scope of applicability of semiconductor diodes in microwave applications.

It is an object of the present invention to provide diodes and other semiconductor devices which can be coupled into electromagnetic wave circuits solely through electromagnetic radiation, employing no conductive connection, thereby not only eliminating the resistive losses characteristic of prior circuit connecting devices, but also providing rugged and long-lasting semiconductor devices of improved qualities not heretofore available. For many applications of microwave diodes, especially variable capacitance type diodes, such as those known by the term "Varactor," it is not necessary to provide a D.C. return to other elements of the system in which the diode is employed.

It is another object of the invention to provide such a semiconductor device in which diode and radiation coupling elements are enclosed entirely in a hermetically sealing envelope made of electromagnetic wave permeable material enabling the coupling elements to function in the nature of antennae to couple the diode element or elements to an electromagnetic wave field through the envelope.

According to the invention, a semiconductor element which may be of the PN, PIN, PNP, mesa, or any suitable type is connected by any usual ohmic bonding technique to one end each of a pair of metal rods. The rods may be straight or curved and their length such that they form a tuned system, for example a half-wave dipole, for the purpose of coupling with an electromagnetic field. The rods and the semiconductor element may be enclosed in a glass, quartz or other suitable hermetically sealable electromagnetic wave permeable envelope. They are supported within such an envelope by an electromagnetic wave permeable solid electrically nonconductive material, for example a fill of polyethylene. Alternatively, the rods can be fitted into a short sleeve of solid dielectric material, such as steatite, quartz or fused alumina, for example, which serves to hold together the ends which are connected to the semiconductor element, which in turn is located within the sleeve. The sleeve may then be firmly mounted in such an hermetically sealed envelope. This structure permits the rods to be adjusted toward each other and is particularly useful in semiconductor devices of the kind in which a pressure contact must be maintained between two parts of a semiconductor element. The wave conductors can be circular or straight and may in some cases be made of a single curved loop open at one location for reception of the semiconductor element or elements. Internal D.C. returns can be provided by bonding two diode elements between the confronting ends of two rods, one element being in the P-N direction, while the other is in the N-P direction—such devices being useful, for example, in peak clipping.

Figure 2:
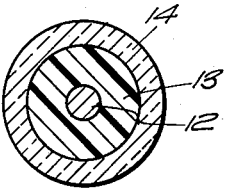
Figure 3:
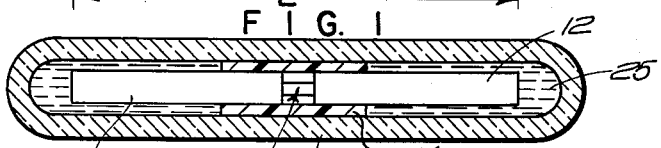
Figure 4:
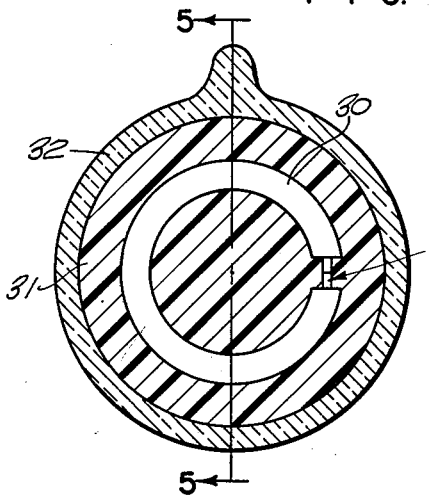
Figure 5:
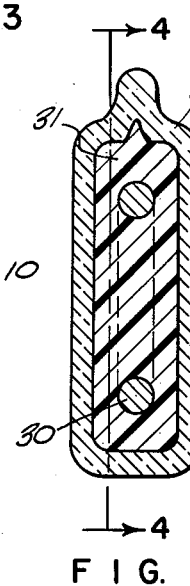
Figure 6:
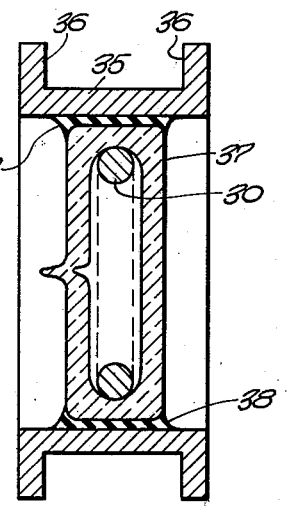
Figure 7:
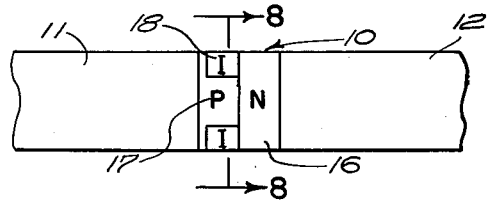
Figure 8:
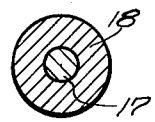
Figure 9:
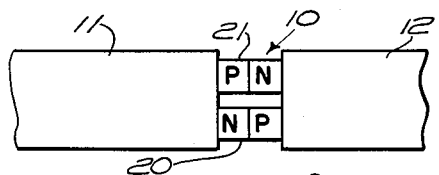
Figure 10:
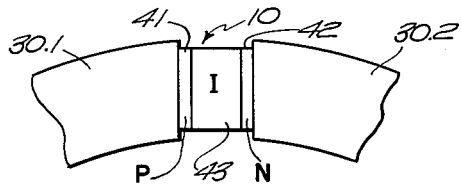
Figure 12:
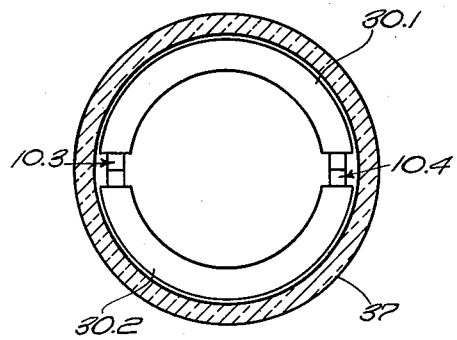
Figure 11:
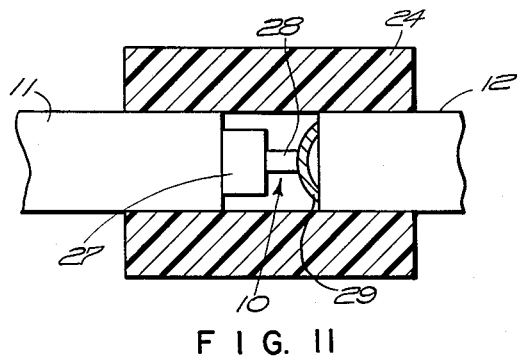
Figure 13:
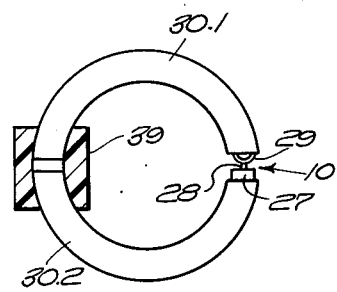
Figure 14:
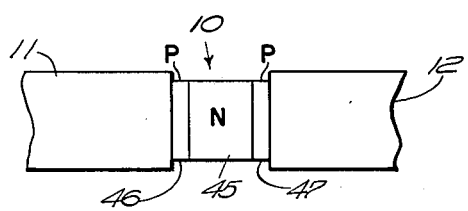
Figure 15:
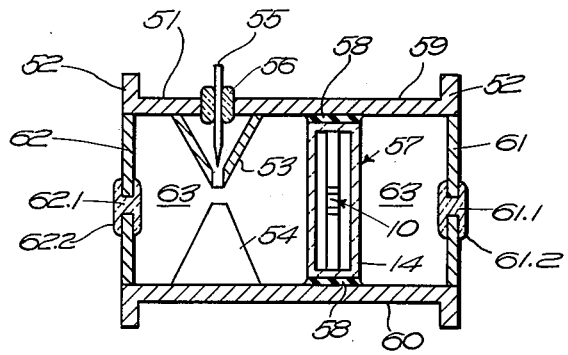
Figure 16:
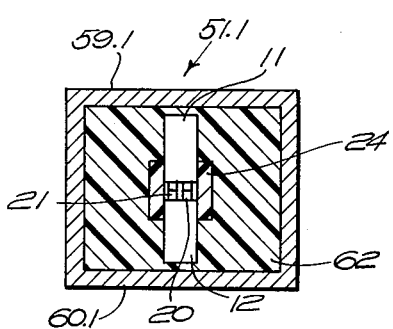
Figure 17:
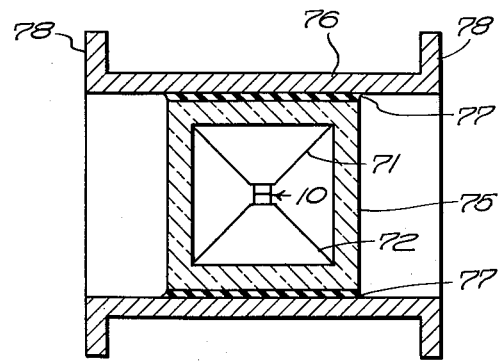

Other and further advantages and features of the invention will become apparent from the following description of certain embodiments thereof. This description refers to the accompanying drawings, wherein:

FIG. 1 shows a semiconductor device according to the invention;
FIG. 2 is a cross section along line 2—2 of FIG. 1;
FIG. 3 show a second embodiment of the invention;
FIG. 4 shows a third embodiment of the invention viewed along line 4—4 of FIG. 5;
FIG. 5 is a cross section along line 5—5 of FIG. 4;
FIG. 6 is another embodiment, similar in principle to FIG. 5;
FIG. 7 is an enlarged partial view of an I/NP semiconductor element bonded to two rods;
FIG. 8 is a cross section along line 8—8 of FIG. 7;
FIG. 9 is an enlarged partial view showing two PN diodes reversely bonded between two rods;
FIG. 10 is an enlarged partial view showing another form of PIN semiconductor element bonded between two curved rods;
FIG. 11 is an enlarged partial view showing two rods held at their ends in a sleeve holding semiconductor elements under pressure between them;
FIG. 12 is another embodiment employing circular antennae;
FIG. 13 is a circular embodiment employing the principles of FIG. 11;
FIG. 14 is an enlarged partial view showing a PNP configuration bonded between two rods;
FIG. 15 illustrates one mode of employing a device according to the invention;
FIG. 16 is a cross-sectional view illustrating a mode of employing devices according to the invention in a waveguide; and
FIG. 17 illustrates another device according to the invention installed in a section of waveguide.

Referring now to FIG. 1, a semiconductor element 10 is bonded to two electrically conductive rods 11 and 12 and the entire assembly of these elements is mounted in a solid plastic body 13 such as polyethylene. The plastic body is in turn surrounded by a hermetically sealing envelope 14 which is made of glass or quartz, for example. As is shown in FIG. 2, the envelope 14 may conveniently be cylindrical in cross section and the assembly of semiconductor element and conductors 10, 11 and 12 is in the present embodiment axially located therein. The semiconductor element 10 is representative of various forms and configurations of semiconductor means, some of which will hereinafter be described in greater detail. As shown in FIG. 1, the semiconductor element 10 has a region of P type material 10.1 and a region of N type material 10.2, and each of these regions may be regarded as an electrode which is ohmically connected, respectively, to one of the two conductive rods 11 and 12. The length L of this assembly is preferably one-half wave length overall for the center of the frequency band of microwave energy in the environment in which the device is intended to be employed.

Referring to FIGS. 7 and 8, one useful configuration of the semiconductor means 10 and rods 11 and 12 is shown greatly enlarged. In FIG. 7, the semiconductor element is made of a region 16 of N type material and a region 17 of P type material bonded, (i.e., ohmically connected) respectively, to the rods 12 and 11. The region 17 of P type material is surrounded by a region 18 of intrinsic semiconductor material; the P type material 17, however, covering the intrinsic material at the area of juncture with the confronting rod 11, so that in effect the intrinsic material 18 surrounds the junction between the P and N type materials 17, 16, respectively.

In some applications it is desirable to have available the functions of two reversely connected diodes. In such applications the configuration illustrated in FIG. 9 is useful. In that figure, the semiconductor means 10 is composed of two semiconductor elements 20 and 21, each of which is a PN semiconductor diode. These two diodes are reversely bonded between the two rods 11 and 12 so that they afford in effect a pair of reversely connected diodes in a single device.

In some applications it is desirable to have available the functions of Zener diodes, and in such applications the configuration illustrated in FIG. 14 is useful. In this figure the semiconductor element 10 is composed of a region 45 of N type material between two regions 46 and 47 of P type material, the P type regions 46 and 47 being ohmically bonded, respectively, to the rods 11 and 12, and being effectively the electrodes through which the semiconductor element 10 is connected to the two rods.

The embodiment of the invention shown in FIG. 3 includes a rigid sleeve element 24, made of an electrically non-conductive material such as steatite, quartz or fused alumina, for example. The rods 11 and 12 fit telescopically into and are tightly held by this sleeve, and the semiconductor element 10 reposes within the sleeve. The sleeve in turn is tighty held in the envelope 14 so that the rods require no other support relative to the envelope. This permits the envelope to enclose a dielectric liquid or gas having heat transfer characteristics to aid in the dissipation of heat. In the embodiment shown in FIG. 3 a liquid 25 is employed. This liquid may be carbon tetrachloride, freon or a hydro-carbon oil, for example, and it may partially fill the envelope, if desired. A gas suitable for heat transfer would be helium or hydrogen. A solid resin fill such as is shown in FIG. 1 also helps heat transfer.

Referring to FIG. 11 which shows the sleeve 24 and rods 11 and 12 greatly enlarged, the configuration of the semiconductor element 10 is here of the mesa diode type, providing a voltage variable capacitance diode. It comprises a body 27 of semiconductor material mounted on one of the rods 11, and having a projection or mesa 28 on it. The mesa is held in contact with an electrically conductive spring element 29 which is mounted on the confronting end of the other rod 12. In this embodiment the body 27 and the spring element 29 are regarded as the two electrodes by which the semiconductor element 10 is connected to the rods 11 and 12, respectively. The pressure between the mesa 28 and the spring element 29 is adjusted and held constant by means of the sleeve 24. Mechanical means for fixing such an adjustment are too well known to require description.

Referring to FIGS. 4 and 5, the semiconductor element 10 is here held in a ring 30 of electrically conductive material. The diameter of the ring 30 is such that it readily couples electromagnetically to certain forms of electromagnetic wave energy. The assembly of the semiconductor element 10 and ring 30 is mounted, as in FIG. 1, in a body 31 of dielectric material similar to the body 13 of FIG. 1, which in turn is held in a glasss, quartz or other suitable hermetically sealing envelope 32. As is shown in FIG. 5 the contour of the envelope is that of a flat cylinder.

While, as will become apparent as the description of the invention and its uses progressses, the hermetically sealed devices of the invention can readily be inserted into openings in rectangular and circular waveguides and cavities, for example, the embodiments shown in FIG. 6 include a section of waveguide 35 having flanges 36 for attachment to other waveguides. In this case the hermetically sealing envelope 37 is of such a diameter that the ring conductor 30 fits tightly within the inner periphery of the envelope and no other solid supporting body is needed for it. Accordingly, as in FIG. 3, a liquid or gas can be included in the envelope 37, if desired. In FIG. 6, the envelope 37 is held in place in the waveguide 35 by means of a suitable cement 38.

The ring 30 of FIGS. 4, 5 and 6 constitutes a short-circuit D.C. return. If this is undesirable, it can be opened with another semiconductor element as is shown in FIG. 12. In FIG. 12, the ring 30 is in two parts 30.1 and 30.2, each constituting approximaetely a semicircle. Two semiconductor means in the form of diodes 10.3 and 10.4 are bonded each between a pair of confronting ends of the parts 30.1 and 30.2 and the entire assembly fits tightly within a hermetically sealing envelope 37, which may be identical to that shown in FIG. 6.

The ring 30 can be open-circuited with a capacitor as is shown in FIG. 13. This figure shows a circular assembly (the envelope being omitted to avoid unnecessary duplication), in which the ring halves 30.1 and 30.2 are held together by a sleeve 39 which holds one end of each sleeve in spaced-apart confronting relation. The sleeve 39 is electrically non-conductive like the sleeve 24 in FIG. 11. The semiconductor means 10 can be similar to those used in the other devices. For the sake of illustration, a mesa type diode element 27, 28, 29 similar to that of FIG. 11 is shown.

Referring to FIG. 10, a semiconductor means 10 in the form of a PIN diode element comprising a layer 41 of P type material and a layer 42 of N type material, having a comparatively larger region 43 of high restivity, or so-called "intrinsic" semiconductor material between them, is bonded to two curved rods, here illustrated as the half-rings 30.1 and 30.2, respectively, of FIG. 12 or FIG. 13. It will be appreciated that the ring ends shown in FIG. 10 may as well be the ends of the ring 30 of FIG. 4, and that the semiconductor configuration illustrated in FIG. 10 can be used in the other embodiments of the invention.

In FIG. 15 a waveguide structure comprising a section 51 of rectangular waveguide having flanges 52 for attachment to other waveguides is provided with two cone-shaped confronting electrodes 53 and 54 of the type customarily used in TR tubes, mounted on opposite inner surfaces of the wide walls 59 and 60, respectively. As is customary in TR tubes, one of these electrodes 53 is hollow and is provided with a "keep-alive" or ignitor electrode 55, which extends to the outside of the waveguide section 51 supported in a hermetically sealed sleeve such as a glass bead 56. A metal wall 61, 62 is sealed in each end of the waveguide section, near the flanges 52. These walls are provided with iris openings 61.1, 62.1, which are hermetically sealed with glass or other suitable material 61.2, 62.2, in any well known fashion. The known TR tube structure thus far described in FIG. 15 permits the use of a gaseous fill in the space 63 within the waveguide section 51; it is described for the purpose of illustration only and does not form part of the present invention.

A hermetically sealed diode device 57 according to the present invention, of the general construction which is shown for example in FIG. 1 or FIG. 3, is mounted in the waveguide section 51, without making any direct electrical connection to any part of the waveguide or any of the other elements in it. In the particular diode device shown in FIG. 15, the semiconductor means 10 has the double anode Zener diode configuration illustrated in FIG. 14, and the envelope 14 is held in place by means of cement 58 like the cement 38 in FIG. 6. The supporting fill (corresponding to the fill 13 in FIG. 1) is omitted in FIG. 15 for the sake of clarity of illustration, it will be understood that a suitable supporting structure is provided in practice, as hereinabove described. The encapsulated device 57 is thus provided in a TR tube having its own gaseous environment 63 for the gap electrodes 53, 54 and the iris windows 61.2 and 62.2, from which the environment of the semiconductor element 10 is isolated by means of the hermetically sealed envelope 14. The choice of a Zener diode configuration here, a double anode Zener, provides clipping of the initial spike of energy which TR tubes pass prior to the firing of the spark gap. The diode device 57 is preferably located one-quarter wave in the waveguide 51 at the mid-band operating frequency from the gap between the electrodes 53 and 54. At wavelengths shorter than approximately ten centimeters the problem of achieving this spacing becomes difficult, with the result that spike or peak-wave limiting of energy passed by TR tubes just prior to their being fired becomes increasingly difficult with each increase in operating frequency. The construction according to FIG. 15 provides this peak-wave limiting capability at high frequencies extending into the millimeter wave bands.

FIG. 16 illustrates a device according to FIG. 9 supported in the sleeve 24 of FIG. 3 but with no other envelope, located in a rectangular waveguide section 51.1, which, if desired, may be part of a TR tube structure like the section 51 of FIG. 15. The diode device comprising rods 11 and 12 and two reversely connected PN junctions 21 and 22 is located between the wide walls 59.1 and 60.1 of the waveguide 51.1. In this position the two reversely connected diodes will function, for example, as a limiter to remove high energy spikes from signals passing through the waveguide section (in the fundamental mode for the waveguide 51.1 shown in the figure). The sleeve 24 affords the hermetic seal for the diodes 20 and 21, and no other envelope is used. The assembly including the antennae 11 and 12 is supported in an electromagnetic wave permeable matrix, such as foamed polystyrene (styrofoam) 62.

FIG. 17 illustrates an embodiment of the invention in which the semiconductor means 10 is connected between two electrical conductors 71 and 72 which are conical in shape. The wide or base portions of these conductors are held in a quartz, glass or other suitable hermetically sealed envelope 75. The smaller ends of these conical conductor elements 71 and 72 confront each other, and the diode element 10 is located between these ends. This configuration is useful in transmit-receive operations, for example in a radar set, and conveniently the envelope 75 is supported within a waveguide section 76. The envelope 75 is of a shape such that it fits closely within the walls of the waveguide 76 where it can be held by a suitable cement 77, like the cement 38 of FIG. 6. The waveguide 76 is supplied with flanges 78 for attachment to other waveguide structures. The structure of FIG. 17 will be recognized as mechanically similar to that of FIG. 6. The semiconductor element 10 in FIG. 17 may, as in the other embodiments, take any specific form that is desirable; for example, the PNP form of FIG. 14 or the reversely connected diodes of FIG. 9 may be used. Further, the device 57 of FIG. 15 can be modified to employ electrical conductors according to the embodiment of FIG. 17, if desired.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims. As a particular illustration, it is well known that N-type and P-type materials are interchangeable in semiconductor configurations. Accordingly, where in the claims one configuration is specified it is intended to include the equivalent interchangeable configuration. Thus, for example, the PNP configuration is the full equivalent of the NPN configuration, and mention of either is intended to include both.

What is claimed is:

1. Semiconductor device comprising a semiconductor element having at least two electrodes, connected to each of said electrodes an electrical conductor dimensioned to couple said element with electromagnetic wave radiation, and an electromagnetic wave permeable dielectric envelope completely surrounding and hermetically sealing said element and said conductors, said envelope constituting at least in part a mechanical support for said element and conductors.

2. Semiconductor device comprising a semiconductor element having at least two electrodes, a loop-shaped conductor having two ends connected one to each of said electrodes, said conductor dimensioned to couple said element with electromagnetic wave radiation, and an electromagnetic wave permeable dielectric envelope completely surrounding and hermetically sealing said element and said conductor, said envelope constituting at least in part a mechanical support for said element and conductor.

3. Semiconductor device comprising a semiconductor element having at least two electrodes, connected to each of said electrodes an elongated electrical conductor of length approximately one-quarter wave relative to electromagnetic waves in a given frequency band, and a dielectric envelope permeable to electromagnetic waves in said band completely surrounding and hermetically sealing said element and said conductors, said envelope constituting at least in part a mechanical support for said element and conductors.

4. Semiconductor device comprising a semiconductor element having at least two electrodes in spring contact with each other, connected to each of said electrodes an electrical conductor dimensioned to couple said element with electromagnetic wave radiation, a rigid support in which each of said conductors is mounted to hold said electrodes together under compression, and a dielectric electromagnetic wave permeable envelope completely surrounding and hermetically sealing said element, conductors and support, said support being fixedly fitted within said envelope and thereby held against movement relative to said envelope.

5. Semiconductor device comprising a semiconductor element having at least two electrodes, connected to each of said electrodes an electrical conductor dimensioned to couple said element with electromagnetic radiation, a dielectric electromagnetic wave permeable envelope completely surrounding and hermetically sealing said element and said conductors, and a support fixedly fitted within said envelope holding said element and conductors in fixed relation to said envelope.

6. Semiconductor device comprising a semiconductor element having at least two electrodes, connected to each of said electrodes an electrical conductor dimensioned to couple said element with electromagnetic ware radiation, a dielectric electromagnetic wave permeable envelope completely surrounding and hermetically sealing said element and said conductors, a support fixedly fitted within and partially filling said envelope holding said element and conductors in fixed relation to said envelope, and a dielectric heat transfer fluid at least partially filling the remainder of said envelope.

7. Semiconductor device comprising a semiconductor element having at least two electrodes, connected to each of said electrodes an electrical conductor dimensioned to couple said element with electromagnetic wave radiation, a dielectric electromagnetic wave permeable envelope completely surrounding and hermetically sealing said element and said conductors, a support of dielectric electromagnetic wave permeable substantially rigid material filling the remainder of said envelope and holding said element and conductors in fixed relation to said envelope.

8. Semiconductor device comprising a semiconductor element having at least two electrodes, connected to each of said electrodes elongated curved electrical conductor means dimensioned to couple said element with electromagnetic wave radiation, a dielectric envelope permeable to electromagnetic wave energy completely surrounding and hermetically sealing said element and said conductor means, said envelope closely embracing and mechanically supporting said element and conductor means in fixed relation.

9. Semiconductor device comprising first and second semiconductor elements each having at least two electrodes, first and second elongated curved electrical conductors of substantially similar length dimensioned to couple said elements with electromagnetic wave radiation, said conductors being disposed with the free ends of said first conductor confronting and spaced from the free ends of said second conductor, said first element being disposed between one pair of confronting ends and said second element being disposed between the other pair of confronting ends, each of said conductors being connected at an end to the confronting electrode of one of said semiconductor elements, and a dielectric envelope permeable to electromagnetic wave energy completely surrounding and hermetically sealing said elements and said conductors, said envelope constituting at least in part a mechanical support for said elements and conductors.

10. Semiconductor device comprising first and second elongated arcuately-curved electrical conductors of substantially similar length dimensioned to couple with electro magnetic wave radiation, said conductors being disposed with the free ends of said first conductor confronting and spaced from the free ends of said second conductor, a rigid support holding said conductors in fixed relation, a semiconductor element having at least two electrodes, said element being disposed between one pair of said confronting ends with one of its electrodes electrically connected to the confronting end of one of said conductors and another of its electrodes electrically connected to the confronting end of the other of said conductors, and a dielectric envelope permeable to electromagnetic wave energy completely surrounding and hermetically sealing said element and said conductors, said envelope constituting at least in part a mechanical support for said element and conductors.

11. Semiconductor device comprising first and second cone-shaped electrical conductors disposed with their apices confronting and spaced apart, a semiconductor element having at least two electrodes, said element being disposed between said apices with said electrodes electrically connected one to each of said conductors, and a dielectric envelope permeable to electromagnetic wave energy completely surrounding and hermetically sealing said element and said conductors, said envelope constituting at least in part a mechanical support for said element and conductors.

12. Semiconductor device comprising a semiconductor element having a region of P type material and a region of N type material, an electrical conductor ohmically connected to each of said regions, said conductors dimensioned to couple said element with electromagnetic wave radiation, and a dielectric electromagnetic wave permeable envelope completely surrounding and hermetically sealing said element and conductors, said envelope constituting at least in part a mechanical support for said element and conductors.

13. Semiconductor device comprising a semiconductor element having a region of N type material, a region of P type material, and a region of intrinsic semiconductor material surrounding the junction between said P type and N type materials, an electrical conductor ohmically connected to each of said P type and N type regions, said conductors dimensioned to couple said element with electromagnetic wave radiation, and a dielectric electromagnetic wave permeable envelope completely surrounding and hermetically sealing said element and said conductors, said envelope constituting at least in part a mechanical support for said element and conductors.

14. Semiconductor device comprising first and second semiconductor elements each having a region of P type material and a region of N type material, a first electrical conductor ohmically connected to the P type region of said first element and the N type region of said second element, a second electrical conductor ohmically connected to the N type region of said first element and the P type region of said second element, said conductors dimensioned to couple said elements with electromagnetic wave radiation, and a dielectric electromagnetic wave permeable envelope completely surrounding and hermetically sealing said elements and said conductors, said envelope constituting at least in part a mechanical support for said elements and conductors.

15. Semiconductor device comprising a semiconductor element having a region of P type material, a region of N type material and between them a region of intrinsic semiconductor material, an electrical conductor ohmically connected to each of said P type and N type regions, said conductors dimensioned to couple said element with electromagnetic wave radiation, and a dielectric electromagnetic wave permeable envelope completely surrounding and hermetically sealing said element and said conductors, said envelope constituting at least in part a mechanical support for said element and conductors.

16. Semiconductor device comprising a semiconductor element having a region of A type material disposed between first and second regions of B type material, where "A" represents N or P type material when "B" represents P or N type material, respectively, an electrical conductor ohmically connected to each of said regions of B type material, said conductors dimensioned to couple said element with electromagnetic wave radiation, and a dielectric electromagnetic wave permeable envelope completely surrounding and hermetically sealing said element and said conductors, said envelope constituting at least in part a mechanical support for said element and conductors.

17. Switch device for electromagnetic wave energy comprising a section of waveguide and a resonant gap type switch therein, and semi-conductor diode means disposed in said section a prescribed distance from said gap, said diode means being adapted for coupling to electromagnetic wave energy in said section by radiation responsive electrical conductors electrically connected to said diode means, a dielectric electromagnetic wave permeable envelope completely surrounding and hermetically sealing said diode means and conductors, said envelope being mounted in said waveguide section and constituting at least in part a mechanical support for said diode means and conductors, said diode means and said conductors being completely insulated from electrically-conductive contact with said waveguide section.

18. Switch device for electromagnetic wave energy comprising a section of waveguide and a resonant gap type switch therein, and semiconductor diode means disposed in said section a prescribed distance from said gap, said diode means being adapted for coupling to electromagnetic wave energy in said section by radiation responsive electrical conductors ohmically connected to said diode means, said diode means and said conductors being completely insulated from electrically-conductive contact with said waveguide section, an electromagnetic wave permeable envelope surrounding and hermetically sealing said diode means and said conductors within waveguide section, said envelope constituting at least in part a mechanical support for said diode means and conductors, and a gaseous atmosphere in said waveguide section surrounding said resonant gap type switch and said envelope.

19. Switch device for electromagnetic wave energy comprising semiconductor diode means, first and second electrical conductors ohmically connected thereto, and an electromagnetic wave permeable dielectric envelope completely surrounding and hermetically sealing said means and said conductors, said envelope constituting at least in part a mechanical support for said diode means and conductors, said conductors being dimensioned to provide, when said envelope is inserted in a section of waveguide, a resonant gap across said waveguide relative to electromagnetic wave energy propagating therein.

20. Semiconductor device comprising a semiconductor element having at least two electrodes, connected to each of said electrodes an electrical conductor dimensioned to couple said element with electromagnetic wave radiation, an electromagnetic wave permeable electrically nonconductive envelope completely surrounding and hermetically sealing said element and said conductors, said envelope constituting at least in part a mechanical support for said element and conductors, and a section of electrically conductive waveguide in which said envelope is mounted with said conductors disposed to couple with electromagnetic wave energy propagating in said waveguide section.

21. Semiconductor device comprising a semiconductor element having at least two electrodes, connected to each of said electrodes an electrical conductor dimensioned to couple said element with electromagnetic wave radiation, a section of waveguide, and dielectric means mounting said device in said waveguide for electrically nonconductive substantially purely radiative coupling with electromagnetic wave energy, said dielectric means constituting at least in part a support for said element and conductors, and being in turn supported in said waveguide and holding said element and conductors entirely free of direct electrical contact with any part of said waveguide.

References Cited in the file of this patent

UNITED STATES PATENTS

| | | |
|---|---|---|
| 2,147,717 | Schelkunoff | Feb. 21, 1939 |
| 2,151,118 | King et al. | Mar. 21, 1939 |
| 2,232,179 | King | Feb. 18, 1941 |
| 2,402,184 | Samuel | June 18, 1946 |
| 2,460,288 | Hansen et al. | Feb. 1, 1949 |
| 2,871,377 | Tyler | Jan. 27, 1959 |
| 2,903,660 | Scott | Sept. 8, 1959 |